(12) United States Patent
Lee

(10) Patent No.: US 9,664,173 B2
(45) Date of Patent: May 30, 2017

(54) TIP AIRFOIL OF WIND TURBINE BLADE

(76) Inventor: Jang Ho Lee, Gunsan-si (KR)

(*) Notice: Subject to any disclaimer, the term of this patent is extended or adjusted under 35 U.S.C. 154(b) by 337 days.

(21) Appl. No.: 14/417,664

(22) PCT Filed: May 11, 2012

(86) PCT No.: PCT/KR2012/003700
§ 371 (c)(1),
(2), (4) Date: Jan. 27, 2015

(87) PCT Pub. No.: WO2013/154225
PCT Pub. Date: Oct. 17, 2013

(65) Prior Publication Data
US 2015/0233344 A1  Aug. 20, 2015

(30) Foreign Application Priority Data
Apr. 13, 2012 (KR) .................. 10-2012-0038213

(51) Int. Cl.
*F03D 1/06* (2006.01)
(52) U.S. Cl.
CPC .................. *F03D 1/0633* (2013.01)
(58) Field of Classification Search
CPC .... F03D 1/0633; F03D 1/0683; F03D 1/0641; F03D 1/0675
See application file for complete search history.

(56) References Cited

U.S. PATENT DOCUMENTS

| | | | | |
|---|---|---|---|---|
| 6,068,446 A | * | 5/2000 | Tangler | F03D 1/0641 |
| | | | | 416/223 R |
| 8,197,218 B2 | * | 6/2012 | Tangler | F01D 5/141 |
| | | | | 416/238 |
| 8,241,000 B2 | * | 8/2012 | Blanton | F03D 1/0641 |
| | | | | 416/223 R |

FOREIGN PATENT DOCUMENTS

| | | |
|---|---|---|
| KR | 10-2008-0063086 A | 7/2008 |
| KR | 10-2011-0012445 A | 2/2011 |
| KR | 10-2011-0012448 A | 2/2011 |
| KR | 10-2011-0092609 A | 8/2011 |
| KR | 10-1059784 B1 | 8/2011 |
| KR | 20110092609 A * | 8/2011 |

OTHER PUBLICATIONS

KR 20110092609 A Machine Translation. Accessed EPO website Nov. 8, 2016.*
International Search Report for PCT Application No. PCT/KR2012/003700.

* cited by examiner

*Primary Examiner* — Richard Edgar
(74) *Attorney, Agent, or Firm* — STIP Law Group, LLC

(57) ABSTRACT

A tip airfoil of a wind turbine blade has a suction surface and a pressure surface formed at the upper side and the lower side of a chord line which connects the leading edge and the trailing edge. The operating Reynolds number is 30,000 to 1,000,000, and the angle of attack of the airfoil is 0 to 21 degrees. The maximum lift coefficient is 1.2 to 1.5, and the minimum drag coefficient is 0.01 to 0.06.

5 Claims, 5 Drawing Sheets

TIP AIRFOIL OF WIND TURBINE BLADE

TECHNICAL FIELD

The present invention relates to a cross-sectional shape of a tip airfoil among airfoils of a blade used in a wind turbine, and more specifically, to a tip airfoil of a wind turbine blade capable of stably rotating with a small driving torque in a condition of a low wind speed.

BACKGROUND ART

As natural resources such as petroleum, coal, natural gas and the like are depleted together with development of industry and increase in population, a lot of studies on general wind turbines for generating electric energy using power of wind are under progress as an alternative energy source, and the range of use of the wind turbines is gradually expanded owing to low cost and eco-friendly reasons since the wind turbines use wind existing in the nature as an energy source.

A wind turbine of a prior art is described with reference to drawings.

Referring to FIG. 1, in a wind turbine 10 of the prior art, a blade 12 having a predetermined length is rotatably installed on the top of a high rising tower 11 built on the surface of the earth using a hub 14 as a medium. The hub 14 is connected to a nacelle 13, and the nacelle 13 is embedded with a gear box, a generator and a control device (not shown) inside thereof. In addition, the wind turbine 10 is configured such that rotating power of the blade 12 may reach the wind turbine 10 through the main shaft by way of the hub 14.

Referring to FIG. 2, the blade 12 obtains a three-dimensional shape by distributing a plurality of airfoil 12a shapes in a span direction (length direction). It is general that a thick airfoil is used toward the root of the blade 12 for structural stiffness and a thin airfoil having a superior lift-to-drag ratio (lift coefficient/drag coefficient) is used toward the tip of the blade 12.

Performance and efficiency of the wind turbine are determined by the shape of the airfoil 12a configuring the cross section of the blade 12, and selecting an appropriate airfoil 12a acts as a very important factor in a wind turbine operating for an extended period of time.

However, most of airfoils 12a currently used in a wind turbine are developed for airplanes, and taking for example the Reynolds number which is an important factor in fluid mechanics, the Reynolds number in an operating condition is about 6,000,000 in the case of an airplane, whereas it is only 500,000 to 1,600,000 in the case of a wind turbine, and thus there is a problem in that decrease in the performance of a wind turbine is induced if an airfoil used in a field of a completely different operating condition is used as a cross-sectional shape of the blade 11 of the wind turbine.

Furthermore, since the blade of a wind turbine is a large size having a span of ten meters or more and is not easy to clean although it is continuously exposed to contamination (dusts, dead bodies of insects, moisture, icing and the like), decrease in performance is expected due to the contamination.

Accordingly, a blade of further higher efficiency cannot be expected since an airfoil developed for airplanes is used as is without considering these effects of blade, and thus a countermeasure for this problem is required.

DISCLOSURE

Technical Problem

Therefore, the present invention has been made in view of the above problems, and it is an object of the present invention to provide a tip airfoil which improves aerodynamic performance and efficiency of a wind turbine by changing the shape of the tip airfoil of a wind turbine blade.

Technical Solution

To accomplish the above object, according to one aspect of the present invention, there is provided a tip airfoil of a blade of a small-scale wind turbine, the tip airfoil having a suction surface and a pressure surface formed at an upper side and a lower side of a chord line which connects a leading edge and a trailing edge, in which an operating Reynolds number is 30,000 to 1,000,000, an angle of attack of the airfoil is 0 to 21 degrees, a maximum lift coefficient is 1.2 to 1.5, and a minimum drag coefficient is 0.01 to 0.06.

A maximum lift-to-drag ratio of the tip airfoil is 26 to 60.

The tip airfoil is extended to be rounded toward a portion higher than the chord line at a point 75% of the chord line and connected to the trailing edge.

A maximum thickness ratio of the tip airfoil is 14%.

The embodiments of the present invention may provide a tip airfoil capable of smoothly rotating a blade with a small wind power and having a superior lift coefficient and a superior lift-to-drag ratio by optimizing the shape of the tip airfoil of the wind turbine blade.

The embodiments of the present invention may provide a wind turbine blade with improved aerodynamic performance and efficiency.

Advantageous Effects

According to the present invention, it is possible to provide a tip airfoil which has superior lift coefficients and lift-to-drag ratios by optimizing the shape of the tip airfoil of a wind turbine blade, thereby improving aerodynamic performance and efficiency of a wind turbine.

MODE FOR INVENTION

Figure 1:
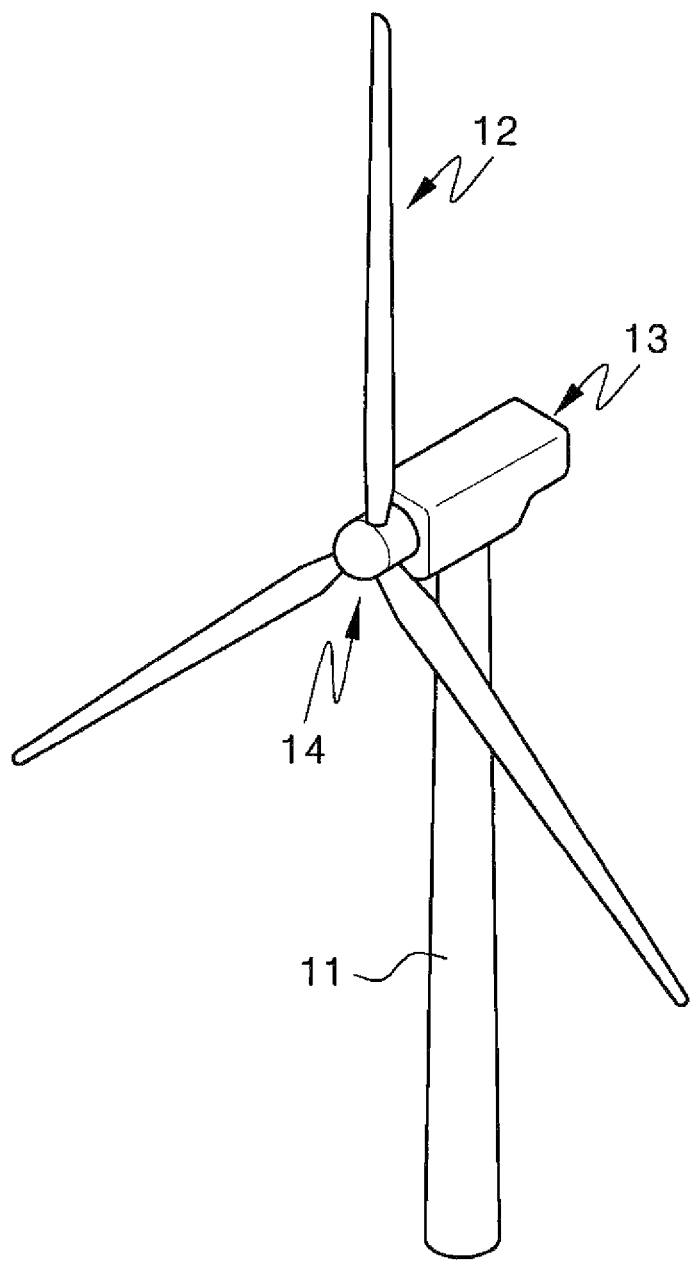
FIG. 1 is a perspective view showing a wind turbine of the prior art.
Figure 2:
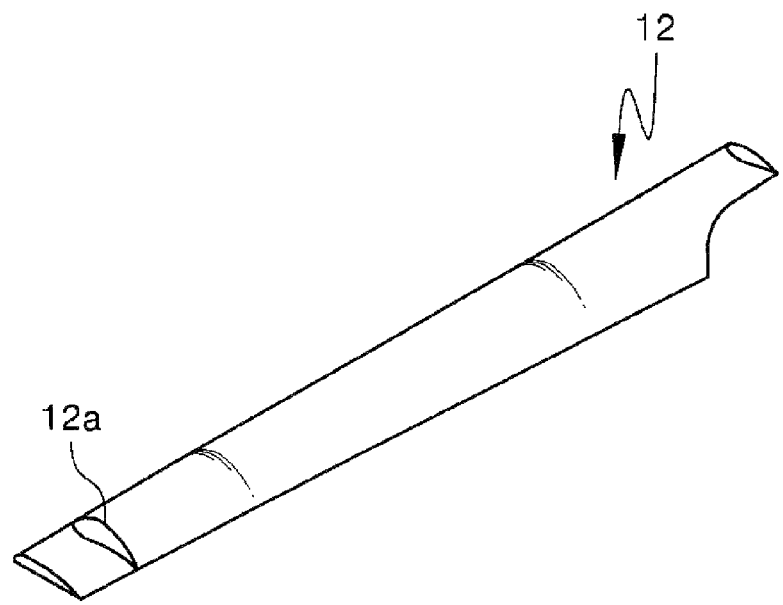
FIG. 2 is a perspective view showing a tip airfoil of a wind turbine blade.
Figure 3:
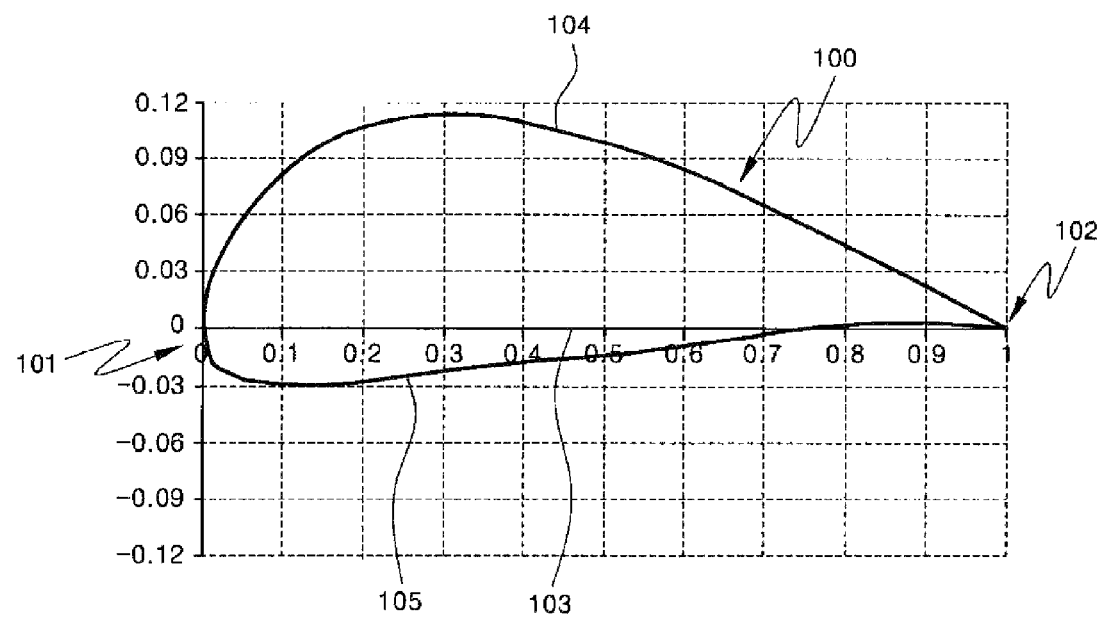
FIG. 3 is a cross-sectional view showing a tip airfoil according to an embodiment of the present invention.

A tip airfoil of a wind turbine blade according to an embodiment of the present invention will be hereafter described in detail, with reference to the accompanying drawings. FIG. 3 is a cross-sectional view showing a tip airfoil according to an embodiment of the present invention.

Referring to FIG. 3, a tip airfoil 100 according to an embodiment of the present invention has a shape applied to the tip of a blade, and aerodynamic performance and efficiency of a wind turbine are determined by the shape of the tip airfoil 100. A wind turbine to which the tip airfoil 100 is applied is a small size configured of a structure generating rotation by the wind without a power control system through a blade pitch control or a stall control.

The tip airfoil 100 according to the present invention has a suction surface 104 and a pressure surface 105 formed at the upper side and the lower side of a chord line 103 which connects the leading edge 101 and the trailing edge 102.

The tip airfoil 100 is a blade used at a wind speed of 15 m/s and has an operating Reynolds number designed in a range of 30,000 to 1,000,000 and a thickness ratio less than 14% in maximum to maximize aerodynamic performance. For reference, the thickness ratio refers to a value obtained by dividing the thickness of the tip airfoil 100 by the length of the chord line 103, and in this embodiment, it is described by limiting the length of the chord line 103 to one meter, and the maximum thickness ratio of 14% means that a point at 14% of the one meter length of the chord line 103 starting from the leading edge 101 has a maximum thickness since the length of the chord line 103 is one meter.

Although it is advantageous to have a high thickness ratio for structural safety of the blade, since the aerodynamic performance of the tip airfoil can be decreased as the thickness ratio increases, the tip airfoil has the thickness ratio described above in order to implement structural safety of the blade and optimum performance of the tip airfoil.

The tip airfoil 100 according to an embodiment of the present invention has a maximum lift coefficient of 1.2 to 1.5 and a maximum lift-to-drag ratio of 26 to 60, and the tip airfoil 100 has the lift-to-drag ratio described above to minimize a bending moment at free ends. For reference, the lift-to-drag ratio refers to a ratio between a lift and a drag that the blade receives, and the lift-to-drag ratio can be expressed as a ratio of a lift coefficient to a drag coefficient.

The tip airfoil 100 is configured by combining the suction surface 104 and the pressure surface 105 distributed along the chord line 103, and the maximum thickness of the tip airfoil 100 and the length of the chord line 103 are treated as one of important factors for determining performance of the tip airfoil 100.

In addition, since the tip airfoil 100 is designed in a range of an operating Reynolds number between 30,000 and 1,000,000, rotation of the blade can be easily accomplished even with a Reynolds number relatively smaller than 1,000,000 which is the Reynolds number of a tip airfoil of a general small-scale wind turbine.

The tip airfoil 100 according to an embodiment of the present invention is manufactured to have an angle of attack of 0 to 21 degrees and is characterized by having a minimum drag coefficient of 0.01 to 0.06.

Here, the angle of attack (AOA) refers to an angle between the chord line of the blade and relative wind, and the chord line refers to an imaginary straight line connecting the leading edge and the trailing edge of the blade. In addition, the relative wind refers to a direction in which the air relatively bumps into the blade when the blade moves forward into the air.

The tip airfoil 100 of the present invention is characterized in that the pressure surface 105 is extended to be rounded toward a portion higher than the chord line 103 at a point 75% of the chord line 103 and connected to the trailing edge 102.

The tip airfoil of a blade according to an embodiment of the present invention configured as described above is described with reference to experiment data comparing the shapes of the tip airfoil of the present invention and the tip airfoil of the prior art. For reference, X/C shown on the X-axis denotes length of the chord line, and Y/C shown on the Y-axis denotes thickness of the tip airfoil. For reference, the dotted line shows the cross-sectional shape of the tip airfoil of prior art 1, and the dot-dash line shows the cross-sectional shape of the tip airfoil of prior art 2.

Figure 4:
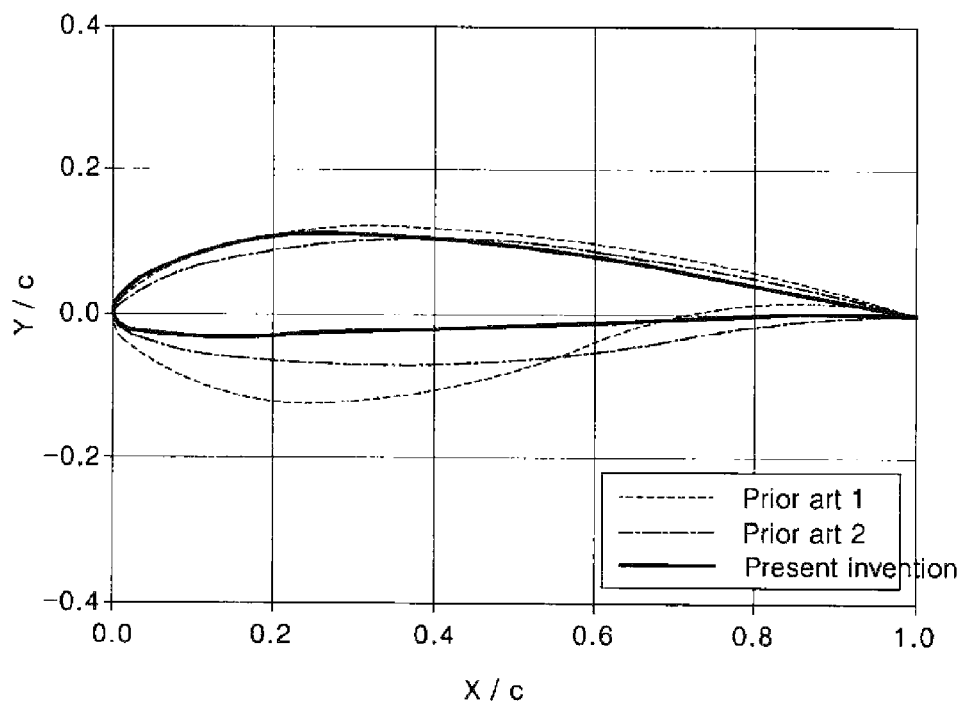
FIG. 4 is a view showing a result of comparing the shape of a tip airfoil of a wind turbine blade according to an embodiment of the present invention and the shapes of tip airfoils according to prior arts 1 and 2.

Referring to FIG. 4, since the tip airfoil 100 of the present invention has a maximum thickness ratio of 14% (a point where thickness of the tip airfoil 100 is maximum at the leading edge 101 with respect to the length of the chord line 103) and is manufactured at a thickness ratio relatively smaller than the thickness ratio of 25% of the prior art 1 and the thickness ratio of 18% of the prior art 2, it is relatively advantageous in the aerodynamic performance compared with the prior arts 1 and 2. In addition, it is understood that the shape of the tip airfoil 100 of the present invention is completely different from those of the prior arts 1 and 2, and, particularly, the pressure surface 105 is configured in a shape completely different from those of the prior arts 1 and 2.

The tip airfoil of a blade according to an embodiment of the present invention will be described with reference to the experiment data comparing the lift coefficients of the tip airfoil of the present invention and the tip airfoil of the prior art. For reference, the experiment is performed after setting the Reynolds number according to the experiment to 30,000. For reference, the experiment on the lift coefficient is performed by comparing the lift coefficient of the present invention with that of prior art 3.

Figure 5:
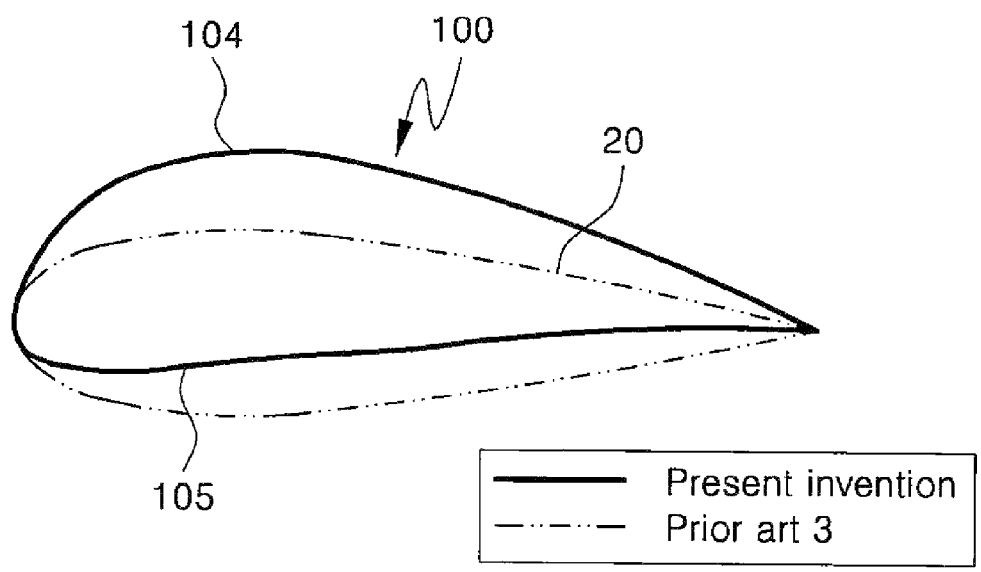
FIG. 5 is a view showing a result of comparing the shape of a tip airfoil of a wind turbine blade according to an embodiment of the present invention and the shape of a tip airfoil according to prior art 3.
Figure 6:
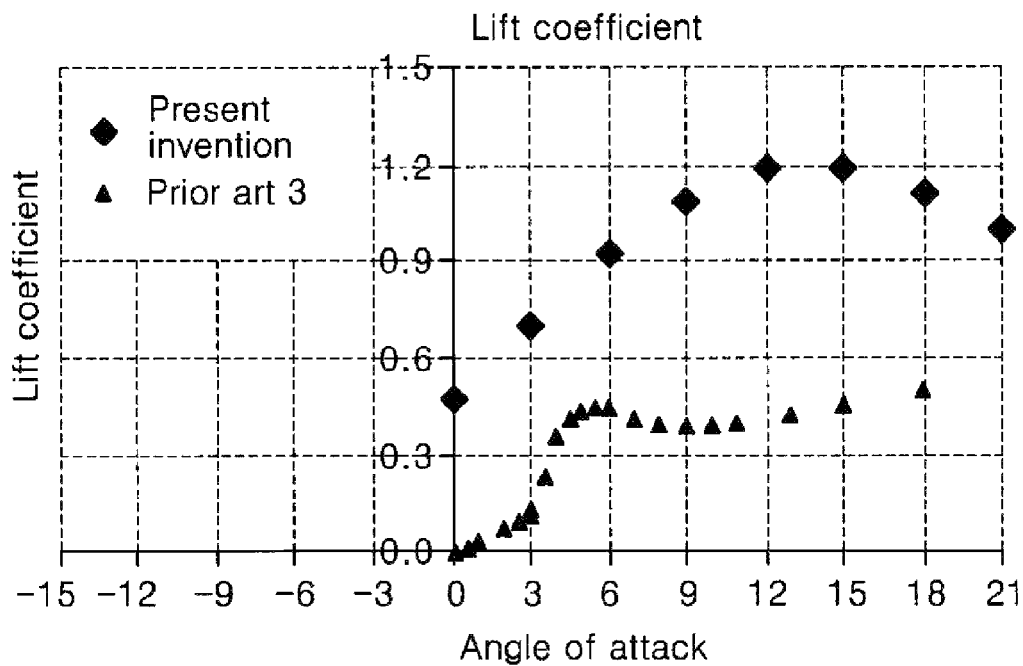
FIG. 6 is a graph showing a result of experiment performed on the lift coefficients of a tip airfoil of a wind turbine blade according to an embodiment of the present invention and a tip airfoil according to prior art 3.

Referring to FIGS. 5 and 6, if the tip airfoil 100 according to the present invention is overlapped and compared with the tip airfoil 20 of the prior art 3, it is understood that there is a big difference in the suction surface 100 and the pressure surface 105 between the shapes of the present invention and the prior art 3.

In addition, since the angle of attack of the present invention has a range of angle between 0 and 21 degrees, the lift according to rotation of the blade is increased remarkably compared with that of the prior art 3, and thus even when the wind blowing to the wind turbine is weak, rotation of the blade can be further easily accomplished.

Contrarily, it is understood in the prior art 3 that the lift coefficient does not exceed 0.6 and is shown to be relatively low compared with the lift coefficient of the tip airfoil 100 of the present invention.

The tip airfoil of a blade according to an embodiment of the present invention will be described with reference to the experiment data comparing the drag coefficients of the tip airfoil of the present invention and the tip airfoil of the prior art.

Figure 7:
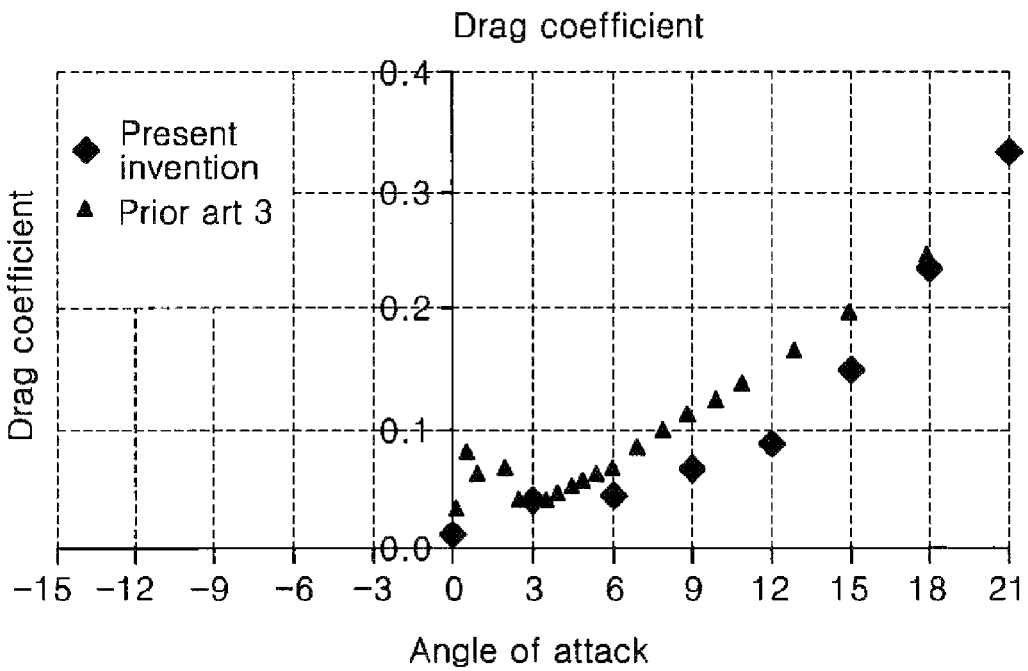
FIG. 7 is a graph showing a result of experiment performed on the drag coefficients of a tip airfoil of a wind turbine blade according to an embodiment of the present invention and a tip airfoil according to prior art 3.

Referring to FIG. 7, it is understood that the tip airfoil 100 of the present invention generally has a drag coefficient smaller than the drag coefficient of the tip airfoil 20 of the prior art 3 as a result of an experiment comparing the tip airfoil 100 of the present invention with the tip airfoil 20 of the prior art 3.

Accordingly, it is understood that when wind is blowing to the wind turbine at a low speed, resistance of the air moving along the surface of the tip airfoil 100 is generated to be relatively smaller than that of the tip airfoil 20 of the prior art 3, and the resistance applied to the tip airfoil 100 is reduced.

The tip airfoil of a blade according to an embodiment of the present invention will be described with reference to the experiment data comparing the lift-to-drag ratios of the tip airfoil of the present invention and the tip airfoil of the prior art.

Figure 8:
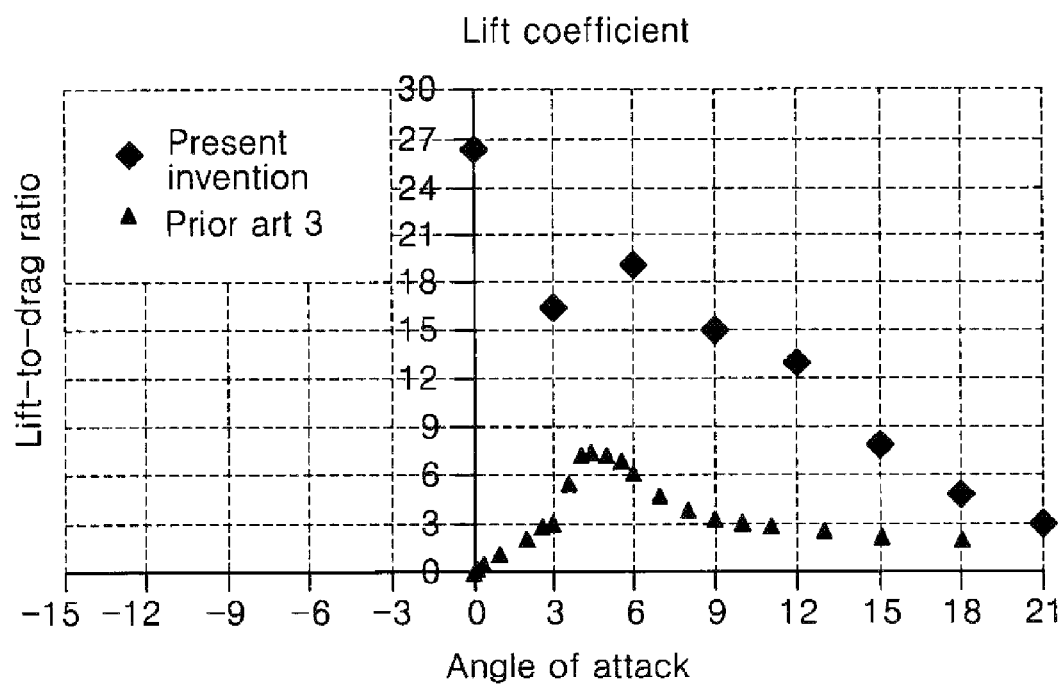
FIG. 8 is a graph showing a result of experiment performed on the lift-to-drag ratios of a tip airfoil of a wind turbine blade according to an embodiment of the present invention and a tip airfoil according to prior art 3.

Referring to FIG. 8, it is understood that when the Reynolds number is 30,000, the lift-to-drag ratio according to the tip airfoil 100 of the present invention is relatively higher than that of the airfoil 20 of the prior art 3, and thus rotation of the blade can be smoothly accomplished even in a condition of a small wind power.

While the present invention has been described with reference to the particular illustrative embodiments, it is not to be restricted by the embodiments but only by the appended claims. It is to be appreciated that those, skilled in the art can change or modify the embodiments without departing from the scope and spirit of the present invention.

The tip airfoil of a wind turbine blade according to an embodiment of the present invention may be applied in the field of a blade of a small-scale wind turbine.

The invention claimed is:

1. A tip airfoil of a blade of a small-scale wind turbine, the tip airfoil having a suction surface and a pressure surface formed at an upper side and a lower side of a chord line which connects a leading edge and a trailing edge, wherein the chord line has a length C extending in a straight line between the leading edge and the trailing edge, wherein the pressure surface has contours expressed by coordinates (X/C, Y/C) substantially as follows: (0.2, −0.028), (0.4, −0.015), (0.6, −0.008), (0.8, 0.003), and (1.0, 0.0), wherein the X/C values are dimensionless coordinates that represent locations on the chord line and the Y/C values are dimensionless coordinates that represent heights from the chord line to points on the pressure surface or the suction surface, wherein an operating Reynolds number is 30,000 to 1,000,000, an angle of attack of the airfoil is 0 to 21 degrees, a maximum lift coefficient is 1.2 to 1.5, and a minimum drag coefficient is 0.01 to 0.06.

2. The tip airfoil according to claim 1, wherein a maximum lift-to-drag ratio of the tip airfoil is 26 to 60.

3. The tip airfoil according to claim 1, wherein the tip airfoil is extended to be rounded toward a portion higher than the chord line at a point 75% of the chord line and connected to the trailing edge.

4. The tip airfoil according to claim 1, wherein a maximum thickness ratio of the tip airfoil is 14%.

5. The tip airfoil according to claim 1, wherein the suction surface has contours expressed by coordinates (X/C, Y/C) substantially as follows: (0.2, 0.106), (0.4, 0.109), (0.6, 0.085), (0.8, 0.044), and (1.0, 0.0).

\* \* \* \* \*